United States Patent
Chen et al.

(10) Patent No.: US 9,204,354 B2
(45) Date of Patent: Dec. 1, 2015

(54) METHOD FOR SMALL CELL DISCOVERY IN HETEROGENEOUS NETWORK

(75) Inventors: Yih-Shen Chen, Hsinchu (TW); Per Johan Mikael Johansson, Kungsangen (SE)

(73) Assignee: MEDIATEK INC. (TW)

( * ) Notice: Subject to any disclaimer, the term of this patent is extended or adjusted under 35 U.S.C. 154(b) by 0 days.

(21) Appl. No.: 13/571,342

(22) Filed: Aug. 9, 2012

(65) Prior Publication Data

US 2013/0040640 A1    Feb. 14, 2013

Related U.S. Application Data

(60) Provisional application No. 61/522,578, filed on Aug. 11, 2011.

(51) Int. Cl.
*H04W 24/00* (2009.01)
*H04W 36/30* (2009.01)
*H04W 36/00* (2009.01)
*H04W 84/04* (2009.01)

(52) U.S. Cl.
CPC .......... *H04W 36/30* (2013.01); *H04W 36/0083* (2013.01); *H04W 84/045* (2013.01); *Y02B 60/50* (2013.01)

(58) Field of Classification Search
CPC ....... H04W 36/30; H04W 4/00; H04W 24/00; H04W 36/00
USPC ................ 455/422.1, 434, 450, 458; 370/331
See application file for complete search history.

(56) References Cited

U.S. PATENT DOCUMENTS

2009/0061892 A1    3/2009    Lee et al. .................... 455/456.1
2009/0098873 A1*  4/2009    Gogic ........................... 455/436
(Continued)

FOREIGN PATENT DOCUMENTS

CN    101459985 A    6/2009
CN    101855929 A    10/2010
(Continued)

OTHER PUBLICATIONS

International Search Report and Written Opinion of International Search Authority for PCT/CN2012/079977 dated Nov. 29, 2012 (12 pages).

(Continued)

*Primary Examiner* — Myron K Wyche
(74) *Attorney, Agent, or Firm* — Imperium Patent Works; Zheng Jin

(57) ABSTRACT

Methods for small cell discovery in heterogeneous networks are proposed for efficient cell search and better power saving. In one novel aspect, a user equipment (UE) measures small cells only when the UE enters into the vicinity of the small cells. For example, the UE detects the proximity of small cells and reports proximity indication information to the network. Based on the vicinity indication, the network provides suitable measurement configuration for small cells. In a second novel aspect, the UE performs guided search for small cell discovery. In a third novel aspect, the UE increases search rate for small cells when it is in the vicinity of small cells, and decreases search rate for small cells when it is not in the vicinity of small cells. The detection may be based on location information provided by the network or based on vicinity detection information autonomously stored by the UE.

22 Claims, 6 Drawing Sheets

(56) References Cited

U.S. PATENT DOCUMENTS

| | | | |
|---|---|---|---|
| 2009/0129341 A1* | 5/2009 | Balasubramanian et al. | 370/331 |
| 2010/0113035 A1 | 5/2010 | Eskicioglu et al. | 455/444 |
| 2010/0261476 A1 | 10/2010 | Wu et al. | 455/444 |
| 2010/0311436 A1 | 12/2010 | Ebvan et al. | 455/456.1 |
| 2011/0171909 A1 | 7/2011 | Jung et al. | 455/41.2 |
| 2011/0287787 A1* | 11/2011 | Nagaraja et al. | 455/456.3 |
| 2011/0294493 A1* | 12/2011 | Nagaraja et al. | 455/422.1 |
| 2012/0100863 A1* | 4/2012 | Klatt et al. | 455/450 |
| 2012/0122492 A1* | 5/2012 | Zhou et al. | 455/456.6 |
| 2012/0214494 A1* | 8/2012 | Awoniyi et al. | 455/439 |
| 2013/0005339 A1 | 1/2013 | Iwamura | 455/436 |
| 2013/0017820 A1* | 1/2013 | Drazynski et al. | 455/422.1 |

FOREIGN PATENT DOCUMENTS

| | | |
|---|---|---|
| EP | 2046091 A1 | 4/2009 |
| EP | 2083599 A2 | 7/2009 |
| EP | 2523501 A1 | 11/2012 |
| JP | 2011501523 | 1/2011 |
| JP | 20119913 | 8/2011 |
| JP | 2012507912 | 3/2012 |
| JP | 2012529822 | 11/2012 |
| JP | 2013516938 | 5/2013 |
| WO | WO2010052688 | 5/2010 |
| WO | WO2011083837 A1 | 7/2011 |
| WO | WO2011087267 | 7/2011 |
| WO | WO2010142692 | 12/2012 |

OTHER PUBLICATIONS

JPO, Office Action for JP patent application 2014-520522 dated Dec. 9, 2014 (9 pages).

EPO, Office Action for the EP patent application 12821775.9 dated Apr. 8, 2015 (8 pages).

ETSI TS 25.367 V9.3.0 (Apr. 2010); Universal Mobile Telecommunications System (UMTS); Mobility Procedures for Home Node B (HNB); Overall Description; Stage 2 (3GPP TS 25.367 version 9.3.0 Release 9).

* cited by examiner

METHOD FOR SMALL CELL DISCOVERY IN HETEROGENEOUS NETWORK

CROSS REFERENCE TO RELATED APPLICATION

This application claims priority under 35 U.S.C. §119 from U.S. Provisional Application No. 61/522,578, entitled "Method for Small Cell Discovery in Heterogeneous Network," filed on Aug. 11, 2011, the subject matter of which is incorporated herein by reference.

TECHNICAL FIELD

The disclosed embodiments relate generally to heterogeneous networks, and, more particularly, to small cell discovery in heterogeneous networks.

BACKGROUND

E-UTRAN is the air interface of 3GPP's Long Term Evolution (LTE) upgrade path for mobile networks. In E-UTRAN mobile networks, the network controls a UE to perform measurement for intra/inter-frequency or inter-RAT mobility by using broadcast or dedicated control. For example, in RCC_IDLE state, a UE shall follow the measurement parameters defined for cell reselection specified by the E-UTRAN broadcast. On the other hand, in RCC_CONNECTED state, a UE shall follow the measurement configurations specified by measurement objects via radio resource control (RRC) messages directed from the E-UTRAN.

Intra-freq measurement occurs when the current and the target cell operate on the same carrier frequency. In such a scenario, UE should be able to carry out measurements without measurement gaps. This is because UE receiver is able to measure reference signals of neighboring cells while simultaneously performing data communication with serving cell in the same frequency. On the other hand, inter-freq measurement occurs when the target cell operates on a different carrier frequency as compared to the current cell. Similarly, inter-RAT (Radio Access Technology) measurement occurs when the target cell operates on a different RAT as compared to the current cell. In such a scenario, UE may not be able to carry out measurements without measurement gaps. This is because UE receiver needs to switch to another frequency to perform measurements and then switch back to the frequency of the current cell to perform data communication.

Current LTE mobile networks are typically developed and initially deployed as homogeneous networks using a macro-centric planning process. A homogeneous cellular system is a network of macro bases stations in a planned layout and a collection of user terminals, in which all the macro base stations have similar transmit power levels, antenna patterns, receiver noise floors, and similar backhaul connectivity to the packet core network. LTE-Advanced (LTE-A) system improves spectrum efficiency by utilizing a diverse set of base stations deployed in a heterogeneous network topology. Using a mixture of macro, pico, femto and relay base stations, heterogeneous networks enable flexible and low-cost deployments and provide a uniform broadband user experience. In a heterogeneous network, smarter resource coordination among base stations, better base station selection strategies and more advance techniques for efficient interference management can provide substantial gains in throughput and user experience as compared to a conventional homogeneous network.

In heterogeneous networks, small cell discovery is important to ensure efficient offload from macrocells to small cells. A small cell may include a picocell, a femtocell, or even a microcell. Because of the relative small cell coverage, inter-frequency measurement time maybe too long for small cells. For example, depending on the measurement gap pattern, inter-frequency cell identification time could be up to 7.68 s, which is unacceptable for small cell discovery. Furthermore, UE may waste power if it keeps trying to search for small cells that are in spotty deployment. Note that, measurement gap may be unnecessary for UE equipped with multiple RF receiver modules. However, for such multi-RF UE, power wasting is still a concern. Therefore, it is desirable to identify and evaluate strategies for improved small cell discovery, especially for the purpose of inter-frequency mobility. The support in 3GPP specifications for closed subscriber group (CSG) cells, which are assumed to be small, has significant drawbacks for networks where a UE may visit large number of small cells, as it relies on the UE storing significant amounts of information for each individual cell where the UE is allowed access.

SUMMARY

Methods for small cell discovery in heterogeneous networks are proposed for efficient cell search and better power saving. In one novel aspect, a user equipment (UE) measures preferred small cells only when the UE enters into the vicinity of the small cells. For example, the UE detects the proximity of small cells and reports proximity indication information to the network. Possible parameters of the proximity indication information may include the entering or leaving the vicinity of a small cell, the cell ID, and the carrier frequency of the small cell. Based on the vicinity indication, the network provides suitable measurement configuration for one or more small cells. The suitable measurement configuration involves configuration items that affect the search performance of small cells, to ensure that UE search for small cells is quick enough. For example, more frequent searching for small cells are used when UE is in the vicinity of small cells, and less frequent searching for small cells are used when UE is not in the vicinity of small cells.

In a second novel aspect, the UE performs guided search for small cell discovery. The UE receives measurement configuration for preferred small cells with cell ID and location information. The UE applies proximity determination on whether the UE enters vicinity of the preferred cell based on the location information. The UE then performs measurements for the preferred cell based on the measurement configuration if the UE is in vicinity of the preferred cell. In one example, the UE continues to perform measurements for the preferred cell even when the RSRP of a serving cell is better than a stop-measure (e.g., s-measure) threshold.

In a third novel aspect, the UE increases search rate for small cells when it is in the vicinity of small cells, and decreases search rate for small cells when it is not in the vicinity of small cells. The detection may be based on location information provided by the network or based on vicinity detection information autonomously stored by the UE. The location information and the stored vicinity detection information contain location (e.g., Latitude and longitude), coverage information (e.g., radio parameters such as signal strength) of a neighbor cell, and/or cellular "RF finger-print".

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
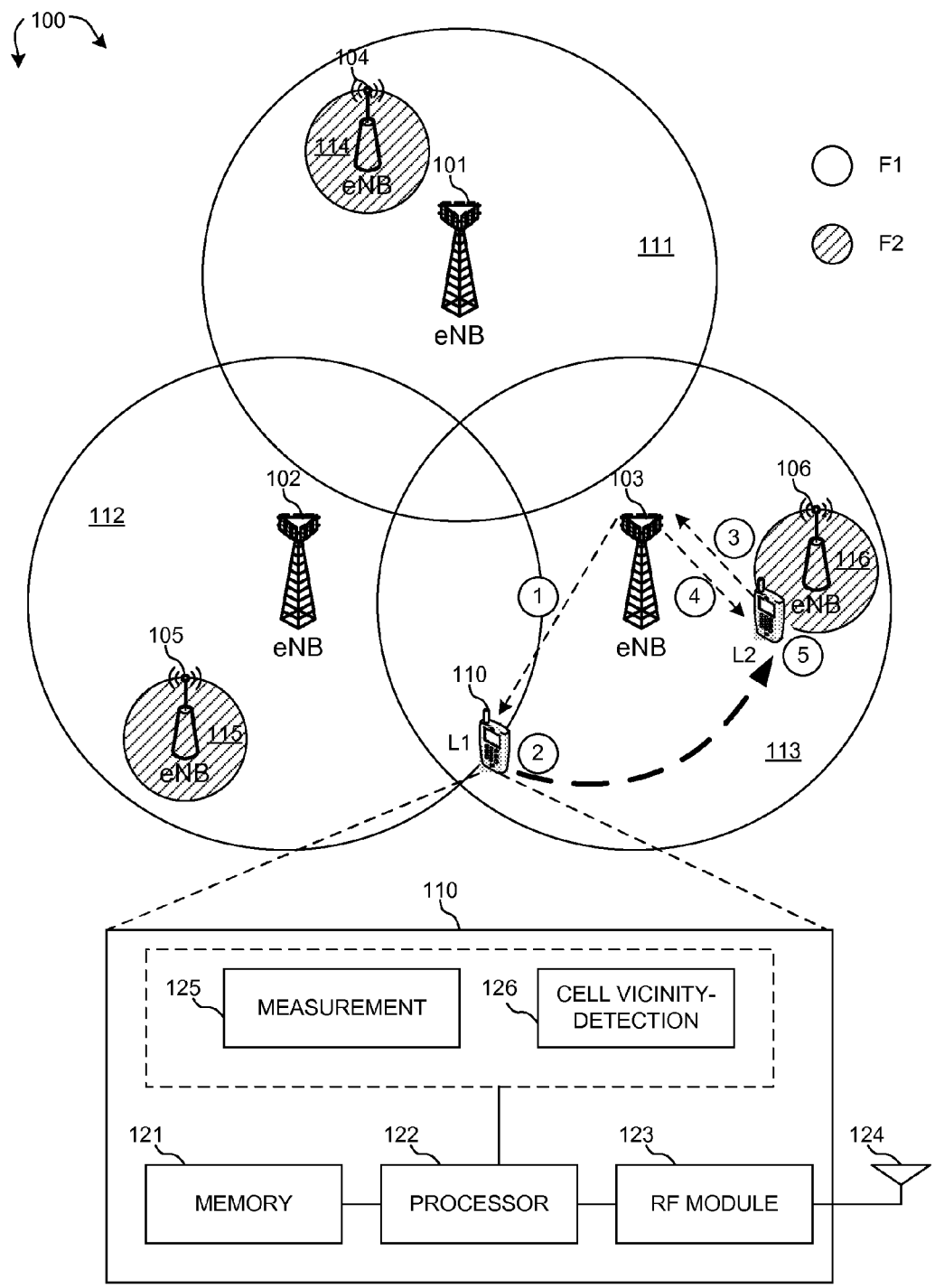
FIG. 1 illustrates a method of small cell discovery in a mobile communication network in accordance with one novel aspect.

FIG. 1 illustrates a method of small cell discovery in a mobile communication network 100 in accordance with one novel aspect. Mobile communication network 100 is a heterogeneous network comprising a plurality of macro base stations eNB 101-103, a plurality of pico base stations 104-106, and a user equipment UE 110. Macro base stations 101-103 serve macrocells 111-113 over a first carrier frequency f1 respectively. Pico base stations 104-106 serve picocells 114-116 over a second carrier frequency f2 respectively. In the example of FIG. 1, macrocells 111-113 are referred to as normal cells or large cells, while picocells 114-116 are referred to as small cells or preferred cells. Small cells in general have much smaller cell coverage as compared to macrocells. Examples of small cells include picocells, femtocells, or microcells.

For mobility management, UE 110 periodically measures the received signal power and quality of its serving cell and neighboring cells and reports the measurement result to its serving eNB for potential handover. For example, Reference signal received power (RSRP) or Reference signal received quality (RSRQ) measurement of a cell helps to rank between the different cells as input for mobility management. Inter-freq measurement occurs when the target cell operates on a different carrier frequency as compared to the current serving cell. In the example of FIG. 1, UE 110 is served by serving eNB 103 in cell 113 over carrier frequency f1. UE 110 may not be able to carry out measurements over carrier frequency f2 without measurement gaps. This is because the receiver on UE 110 needs to switch to carrier frequency f2 to perform measurements and then switch back to carrier frequency f1 to perform data communication. Depending on the measurement gap pattern, inter-frequency cell identification time may take as long as 7.68 s.

In a heterogeneous network, however, the cell size of a macrocell and the cell size of a small cell can be very different. While the inter-frequency measurement time may be acceptable for macrocells, it may be too long for small cells such as picocells. For example, the size of a macrocell typically ranges from one to 20 kilo-meters, while the size of a picocell typically ranges from four to 200 meters. Therefore, it is probably too long for UE 110 to be able to discover picocell 116 during the configured gap time as the target cell when UE 110 moves within the cell coverage of picocell 116. Furthermore, when UE 110 is located far away from any picocell, UE 110 may waste power if it anyway tries to search for small cells.

In one novel aspect, UE 110 only searches for small cells under certain conditions (e.g., based on location information). In one example, UE 110 first obtains physical cell ID (PCI) information from serving eNB 103 such that UE 110 can identify small cells from macrocells (step 1). At location L1, UE 110 is not in vicinity of any small cell and does not search for small cell (step 2). When UE 110 moves into the vicinity of picocell 116 at location L2, UE 110 detects and reports the proximity of picocell 116 to eNB 103 (step 3). Based on the vicinity indication, eNB 103 sends UE 110 measurement configuration for picocell 116 (step 4). Based on the measurement configuration, UE 110 is then able to efficiently measure picocell 116 accordingly (step 5).

FIG. 1 also illustrates a simplified block diagram of UE 110. UE 110 comprises memory 121 containing program instructions and databases, a processor 122, a radio frequency (RF) module having a transmitter and a receiver, an antenna 124 for transmitting and receiving radio frequency signals, a measurement module 125 for performing radio signal measurements, and a cell vicinity-detection module 126 for detecting proximity of small cells. The various modules are function modules and may be implemented by software, firmware, hardware, or any combination thereof. Each base station comprises similar function modules. The function modules, when executed by processors 122 (e.g., via program instructions contained in memory 121), interwork with each other to allow UE 110 to detect and report the proximity of small cells, to receive measurement configuration for small cells, and to perform measurements and report measurement result of small cells to its serving eNB for proper handover decisions.

Figure 2:
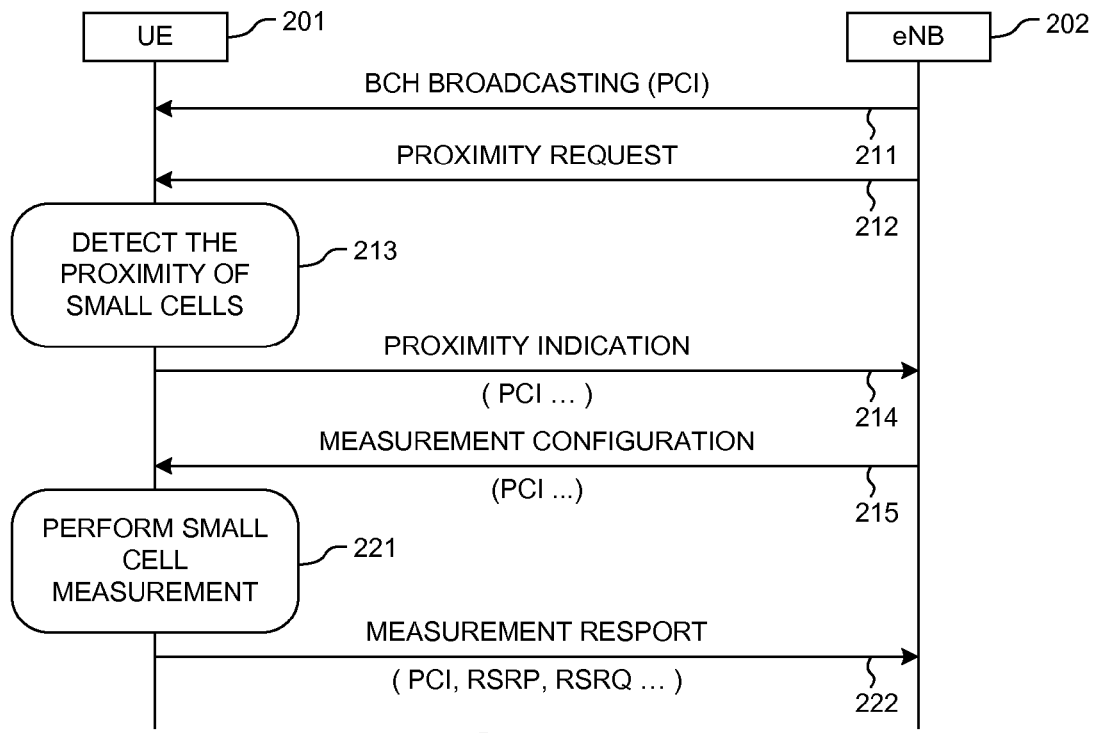
FIG. 2 illustrates a first embodiment of small cell discovery in accordance with one novel aspect.

FIG. 2 illustrates a first embodiment of small cell discovery in accordance with one novel aspect. In step 211, UE 201 receives information broadcasted by eNB 202 via system information block (SIB) carried in a broadcast channel (BCH). The broadcasted information contains physical cell ID (PIC) information of different cells in the network. For example, PCI split information may be used to identify picocells by a specific PCI range (e.g., some specific PCI values are specifically allocated for picocells). In step 212, eNB 202 requests UE 201 to report the proximity of picocells. For example, eNB 202 sends an RRC message (e.g., Proximity request) to UE 201. In step 213, UE 201 detects the proximity of picocells when it moves into the vicinity of picocells. In step 214, UE 201 reports the proximity of picocells via proximity indication information. Possible parameters of the proximity indication information may include the entering or leaving the vicinity of a picocell, the cell ID, and the carrier frequency of the picocell. Based on the reported proximity indication information, in step 215, eNB 202 sends measurement configuration to UE 201 for the picocell. The measurement configuration typically includes the cell ID and the carrier frequency of the picocell to be measured. In step 221, UE 201 performs measurements for the picocell accordingly. Finally, in step 222, UE 201 reports the measurement result (e.g., RSRP and/or RSRQ of the picocell) back to eNB 202.

Under the first embodiment, UE 201 measures picocells only when picocells are nearby. Because picocells are assumed to be in spotty deployment, such method has better power saving. However, UE 201 must be able to detect the proximity of picocells without any assistance from the network. For example, UE 201 may visit picocells before and stores related information (e.g., RF fingerprint) to enable the later proximity detection.

Figure 3:
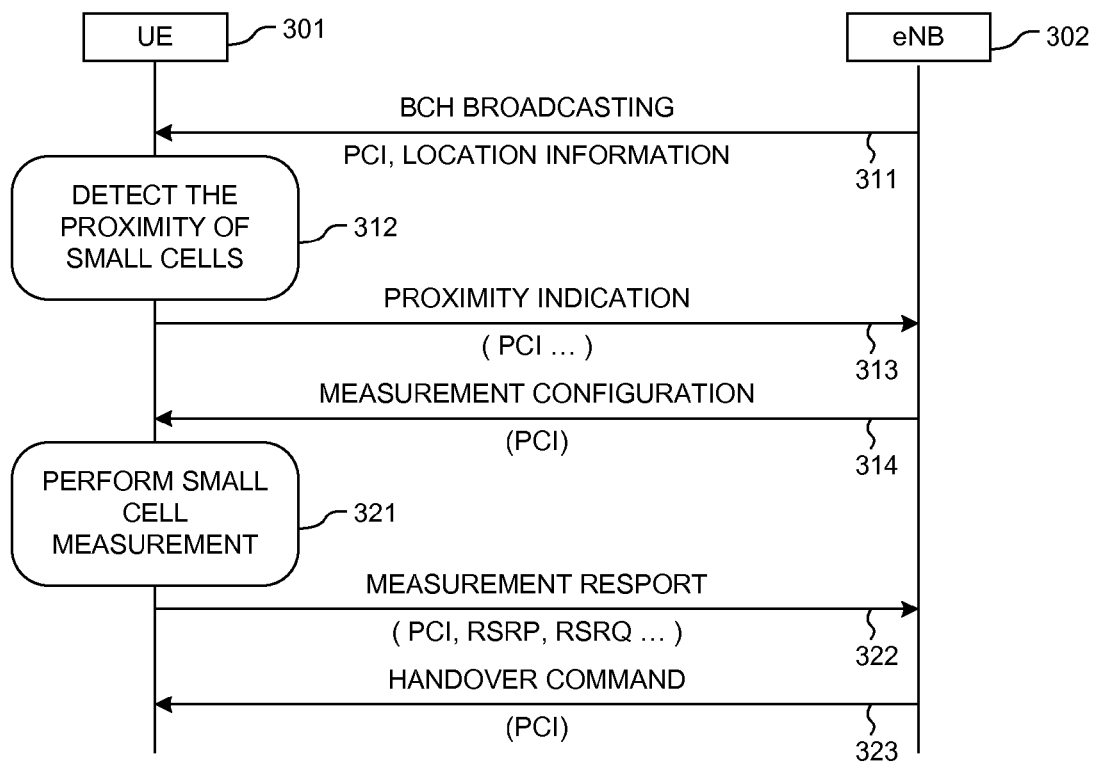
FIG. 3 illustrates a second embodiment of small cell discovery in accordance with one novel aspect.

FIG. 3 illustrates a second embodiment of small cell discovery in accordance with one novel aspect. In step 311, UE 301 receives information broadcasted by eNB 302 via system information block (SIB). The broadcasted information contains physical cell ID (PIC) information of different cells in the network. For example, PCI split information may be used to identify picocells by a specific PCI range. In addition, the broadcasted information may also contain location information of the picocells. In step 312, UE 301 detects the proximity of picocells when it moves into the vicinity of picocells based on the PCI and the location information. In step 313, UE 301 reports the proximity of picocells via proximity indication information. Possible parameters of the proximity indication information may include the entering or leaving the vicinity of a picocell, the cell ID, and the carrier frequency of the picocell. Based on the reported proximity indication information, in step 314, eNB 302 sends measurement configuration to UE 301 for the picocell. In step 321, UE 301 performs measurements for the picocell accordingly. In step 322, UE 301 reports measurement result (e.g., RSRP and/or RSRQ of the picocell) back to eNB 302. Finally, in step 323, based on the measurement result, eNB 302 sends a handover command to UE 301.

Under the second embodiment, UE 301 measures picocells only when picocells are nearby. Because picocells are assumed to be in spotty deployment, such method has better power saving. Furthermore, UE 301 is able to detect the proximity of picocells under the assistance from the network, e.g., using the location information sent from eNB 302. For example, the location information may include radio signal parameters related to coverage of a picocell, and/or a geographical area configuration of the picocell based on latitude and longitude. To be able to fully utilize such location information, UE 301 may have GNSS capability.

Figure 4:
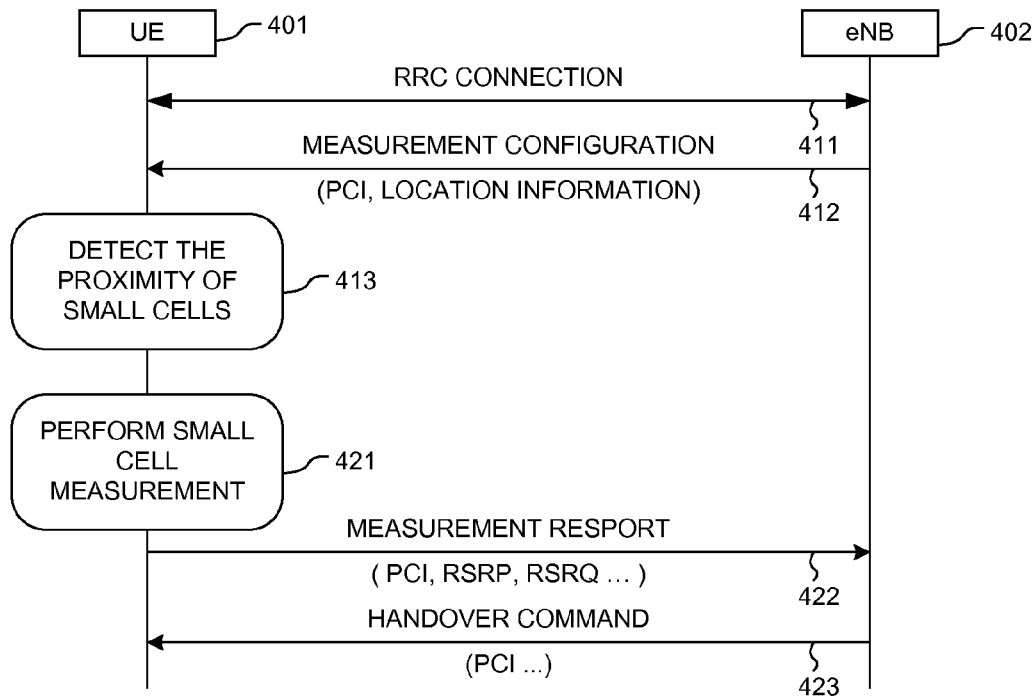
FIG. 4 illustrates a third embodiment of small cell discovery in accordance with one novel aspect.

FIG. 4 illustrates a third embodiment of small cell discovery in accordance with one novel aspect. In step 411, UE 401 and eNB 402 communicate with each other over an established RRC connection. In step 412, eNB 402 sends measurement configuration to UE 401. The measurement configuration contains measurement objects configured for small cells over certain carrier frequencies, as well as PCI and location information of the small cells. Each measurement object contains a set of measurement parameters (e.g., Time-to-Trigger (TTT) values, L3 filtering parameters, measurement bandwidth, etc.) for a specific carrier frequency. The measurement configuration is done by RRC message in RRC_Connected state. In step 413, UE 401 detects the proximity of small cells when it moves into the vicinity of one or several small cells based on the PCI or other information, such as location information and RF fingerprints. In step 421, UE 401 performs measurements for the detected small cells based on the measurement configuration received in step 412. In step 422, UE 401 reports measurement result (e.g., RSRP and/or RSRQ of the small cells) back to eNB 402. Finally, in step 413, based on the measurement result, eNB 402 sends a handover command to UE 401.

Under the third embodiment, UE 401 performs guided search for small cell discovery. The measurement configuration and location information (guidance from the network) for small cells is done ahead of time. Upon UE 401 entering into the vicinity of the small cells, UE 401 starts to measure the small cells. Similar to the second embodiment, UE 401 achieves better power saving because UE 401 measures small cells only when small cells are nearby. UE 401 is also able to detect the proximity of small cells using the location information provided by eNB 402, under the working assumption that UE 401 is equipped with GNSS capability. Under the guided search approach, the small cells are sometimes referred to as preferred cells. This is because the purpose of measuring and discovering the small cells is for traffic off-loading, which is typically preferred for improved spectrum efficiency.

Typically, when the RSRP level of the serving cell is above a threshold value specified by s-Measure, UE stops measuring the signal qualities of neighbor cells, as measurements of neighbor cells are no longer necessary for mobility management purpose. Therefore, for power saving, a parameter to stop UE's measurement activity (e.g., s-Measure) is sometimes used to reduce the frequency of UE's measurements. For small cell discovery, however, the checking condition of s-Measure no longer applies for preferred cells because the purpose is for traffic offloading. As a result, the UE tries to measure preferred cells even if the RSRP of the current serving cell is above the s-Measure threshold value.

Figure 5:
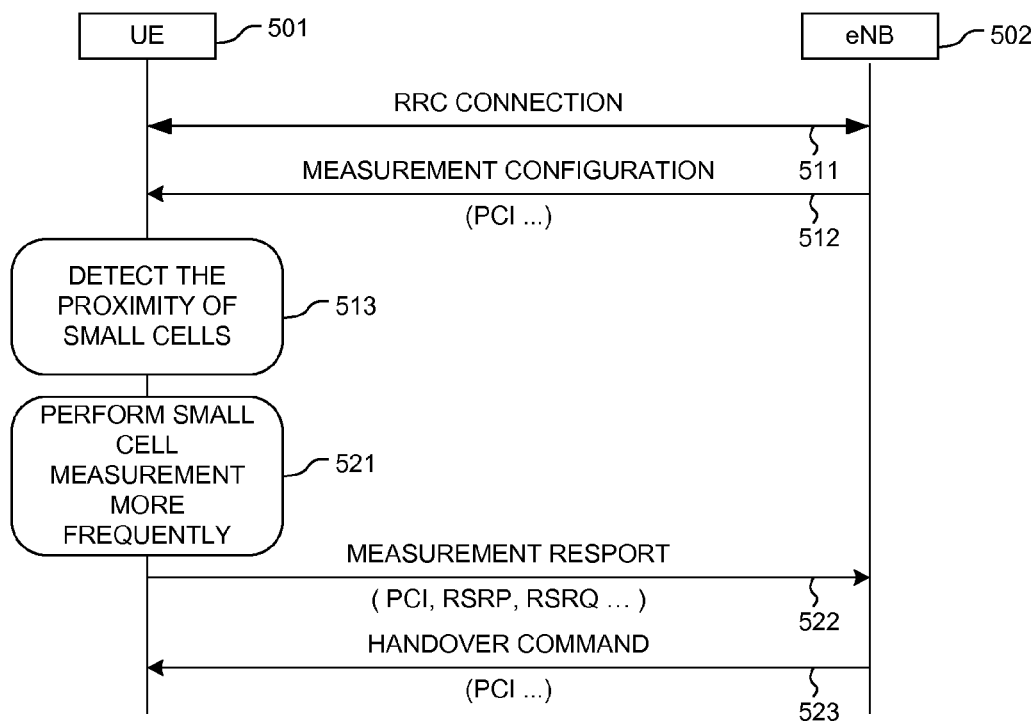
FIG. 5 illustrates a fourth embodiment of small cell discovery in accordance with one novel aspect.

FIG. 5 illustrates a fourth embodiment of small cell discovery in accordance with one novel aspect. In step 511, UE 501 and eNB 502 communicate with each other over an established RRC connection. In step 512, eNB 502 sends measurement configuration to UE 501. The measurement configuration contains measurement objects configured for certain carrier frequencies, as well as PCI and optionally location information of small cells. In step 513, UE 501 detects the proximity of small cells when it moves into the vicinity of one or several small cells based on the PCI or other information, such as location information and RF fingerprints. Alternatively, UE 501 may apply vicinity determination based on autonomously stored vicinity detection information. In step 521, UE 501 performs measurements for the detected small cells. In step 522, UE 501 reports measurement result (e.g., RSRP and/or RSRQ of the picocell) back to eNB 502. Finally, based on the measurement result, eNB 502 sends a handover command to UE 501.

Under the fourth embodiment, UE 501 uses vicinity knowledge to change search/measurement performance and how often it performs search for small cells. For example, when UE 501 determines that it is near one or several preferred small cells, it increases the rate of searching for such cells (e.g., by increase measurement frequency in step 521), as compared to normal search rate for macrocells (e.g., measurement objects configured in step 512). On the other hand, when UE 501 determines that it is not near one or several preferred small cells, it decreases the rate for searching for such cells (e.g., by decrease measurement frequency), as compared to normal search rate for macrocells. By dynamically adjusting search rate depending on vicinity knowledge, UE 501 can perform small cell discovery more efficiently.

Figure 6:
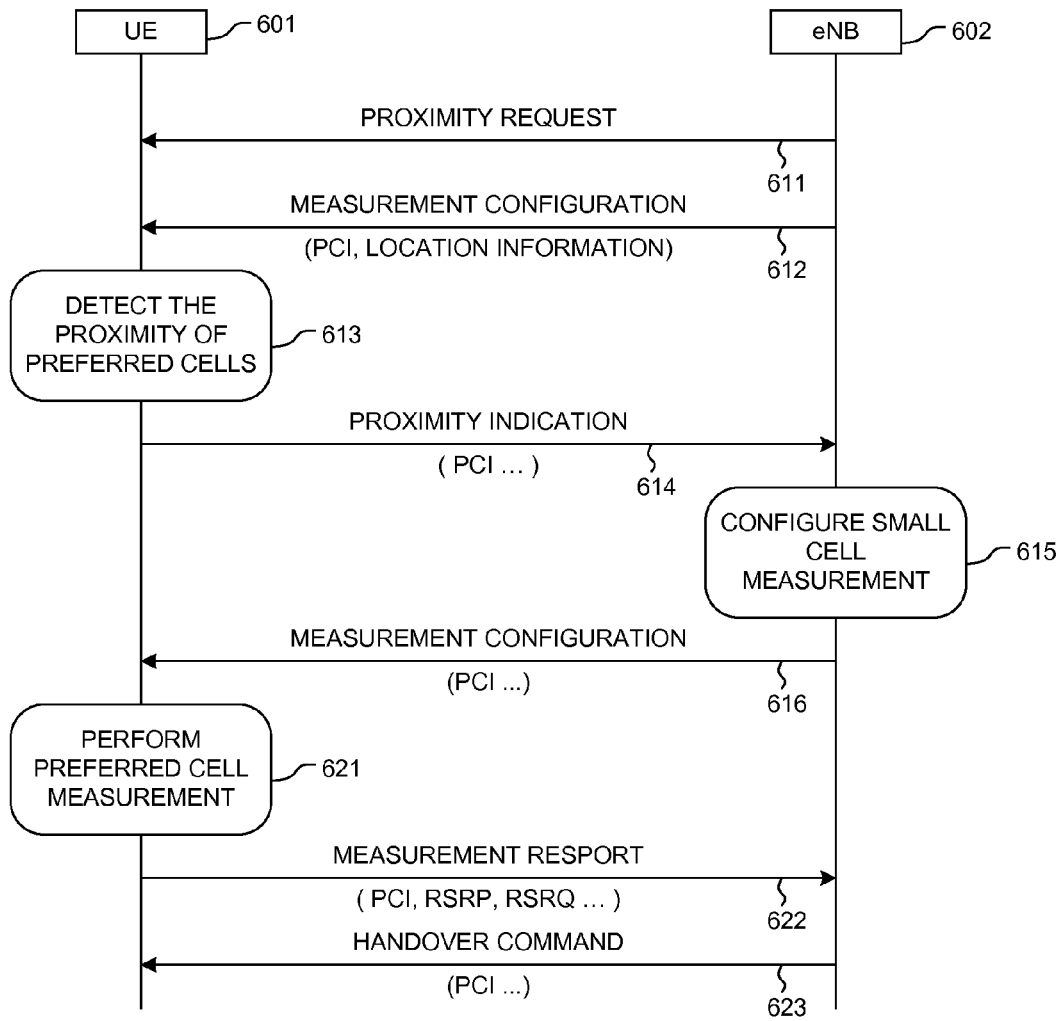
FIG. 6 illustrates a fifth embodiment of small cell discovery in accordance with one novel aspect.

FIG. 6 illustrates a fifth embodiment of small cell discovery in accordance with one novel aspect. In step 611, UE 601 is in connected mode and eNB 602 requests UE 601 to indicate when UE 601 is in the vicinity of preferred neighbor cells (e.g., via proximity request message). In step 612, eNB 602 sends measurement configuration to UE 601. The measurement configuration contains measurement objects configured for cells (e.g., macrocells) over certain carrier frequencies, as well as PCI and optionally location information of preferred cells. In step 613, UE 601 detects the proximity of picocells when it moves into the vicinity of one or more preferred cells based on the PCI or other information, such as location information and RF fingerprints. Alternatively, UE 601 may apply vicinity determination based on autonomously stored vicinity detection information. In step 614, UE 601 reports the proximity of the detected preferred cells via proximity indication information. Possible parameters of the proximity indication information may include the entering or leaving the vicinity of a preferred neighbor cell, the cell ID, and the frequency bands of the neighbor cell. Based on the reported proximity indication information, in step 615, eNB 602 configures a suitable measurement configuration for preferred cells. In step 616, eNB 602 sends measurement configuration to UE 601 for preferred cell measurements. In step 621, UE 601 performs measurements for the preferred cells accordingly. In step 622, UE 601 reports the measurement result (e.g., RSRP and/or RSRQ of the preferred cells) back to eNB 602. Finally, in step 623, based on the measurement result, eNB 602 sends a handover command to UE 601.

The suitable measurement configuration involves configuration items that affect the search performance of small cells, to ensure that UE search for small cells is quick enough. In one embodiment, eNB configures different parameter sets for macrocells and small cells in a measurement object. In another embodiment, eNB configures a set of parameters for small cells in a measurement object. Those small cell specific parameters (e.g., shorter TTT) can further enhance the robustness of mobility. For example, more frequent searching for small cells are used when UE is in the vicinity of one or several preferred small cells. On the other hand, when UE determines that it is NOT in the vicinity of one or several preferred small cells, it may indicate this explicitly to the network. Alternatively, the UE no longer indicates vicinity information, and the network can interpret the absence of such indication as non-vicinity. As a result, the network can ensure that the UE has a suitable measurement configuration involving less frequency searching for small cells.

In order for UE to measure preferred cells, UE needs to have vicinity detection information ahead of time. In one embodiment, UE can autonomously learn and store the vicinity detection information. UE decides to store information about a cell, that the cell is preferred for searching, when the UE has found this cell or the UE is served by this cell. For example, the preferred cell broadcasts certain information, e.g., an explicit indication meaning that "this is a preferred cell for autonomous search", or "this is a picocell type". In another example, another cell (e.g., an inter-frequency macrocell) had indicated that cells on certain frequency bands shall/may be treated as preferred cell for which autonomous search is allowed, recommended, or requested. The macrocell may also provide additional information on how to identify the preferred cells, e.g., via split PCI range information.

After identifying the preferred cells, UE then stores the vicinity detection information of the preferred cells. The vicinity detection information may include information based on GPS location, based on being in coverage of another cell, or based on detecting a cellular "RF finger-print"—a combination of being in coverage of certain cells (maybe on different frequencies), mobility measurement being in certain range, and/or timing measurements.

In another embodiment, UE can rely on network assistance to obtain and store the vicinity detection information. For example, the serving eNB provides explicit information that in a certain geographical area, higher performance search (e.g., frequent searching) shall be applied. The geographical area being defined in terms of cell ID, radio parameters (e.g., signal strength) related to coverage of neighboring cells, or in terms of Latitude and Longitude. Such location information is typically provided to UE by RRC measurement configuration.

Figure 7:
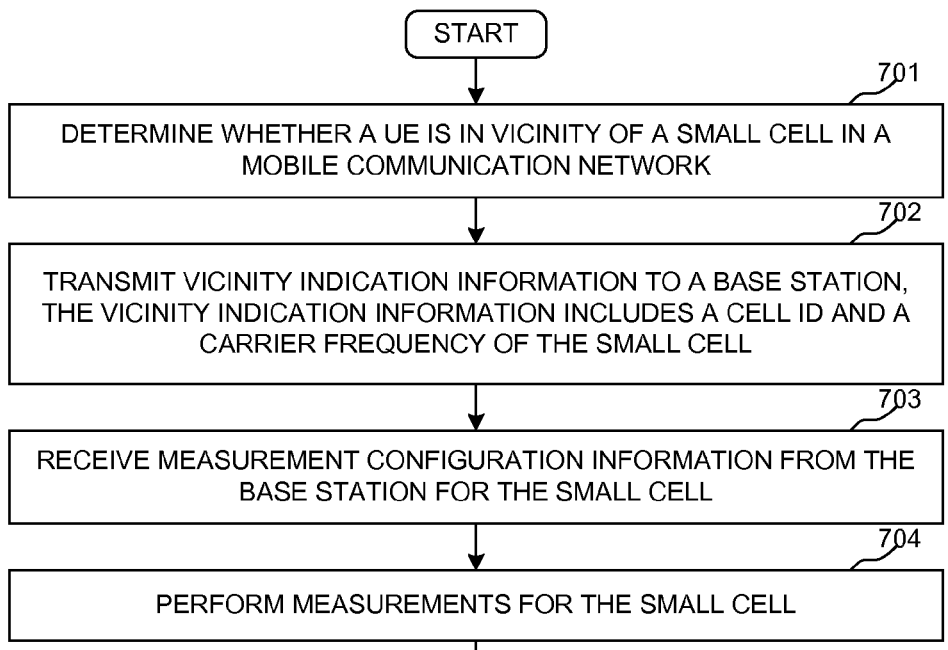
FIG. 7 is a flow chart of one embodiment of small cell discovery in accordance with one novel aspect.

FIG. 7 is a flow chart of one embodiment of a method of small cell discovery in accordance with one novel aspect. In step 701, a user equipment (UE) determines whether the UE is in vicinity of a small cell in a mobile communication network. In one example, the proximity determination is based on location information received from the network. In another example, the proximity determination is based on vicinity detection information autonomously stored by the UE. The location information and the stored vicinity detection information contain location (e.g., Latitude and longitude), coverage information (e.g., radio parameters such as signal strength) of a neighbor cell, and/or cellular "RF fingerprint" information. In step 702, the UE transmits proximity indication information to a base station, and the proximity indication information includes a cell ID and a carrier frequency of the small cell. In step 703, the UE receives measurement configuration for the small cell from the base station. For example, the measurement configuration may contain small cell-specific measurement performance requirement or measurement parameters. In step 704, the UE performs measurements for the small cell.

Figure 8:
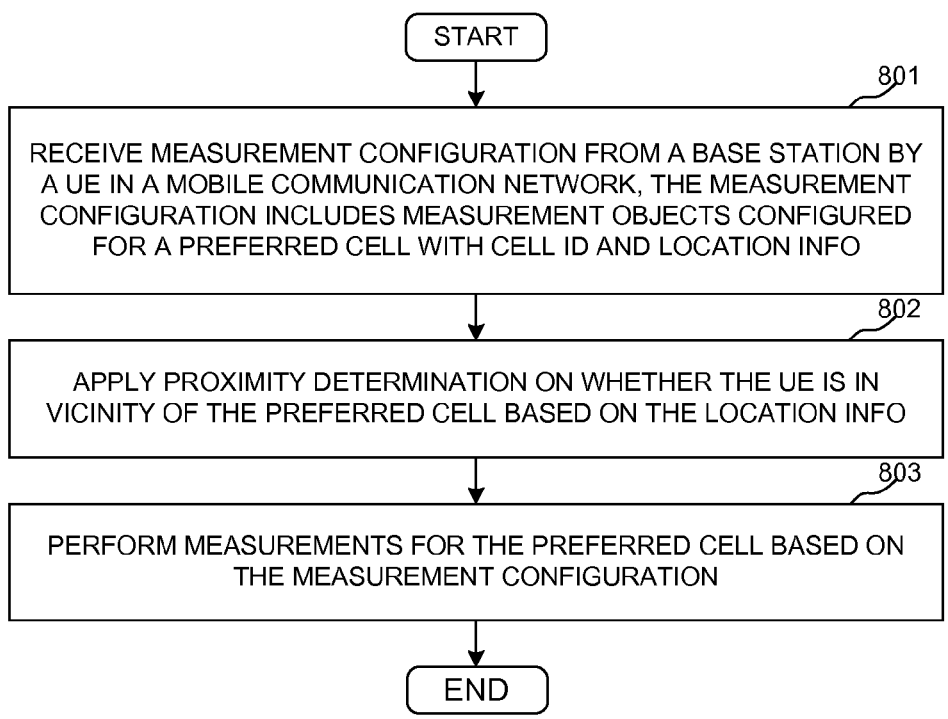
FIG. 8 is a flow chart of a method of guided search for small cell in accordance with one novel aspect.

FIG. 8 is a flow chart of a method of guided search for small cell in accordance with one novel aspect. In step 801, a user equipment (UE) receives measurement configuration from a base station in a mobile communication network. The measurement configuration includes measurement objects configured for a preferred cell with cell ID and location information. In step 802, the UE applies proximity detection on whether the UE enters vicinity of the preferred cell based on the location information. In step 803, the UE performs measurements for the preferred cell based on the measurement configuration if the UE is in vicinity of the preferred cell. In one example, the UE continues to perform measurements for the preferred cell even when the RSRP of a serving cell is better than a stop-measure threshold.

Figure 9:
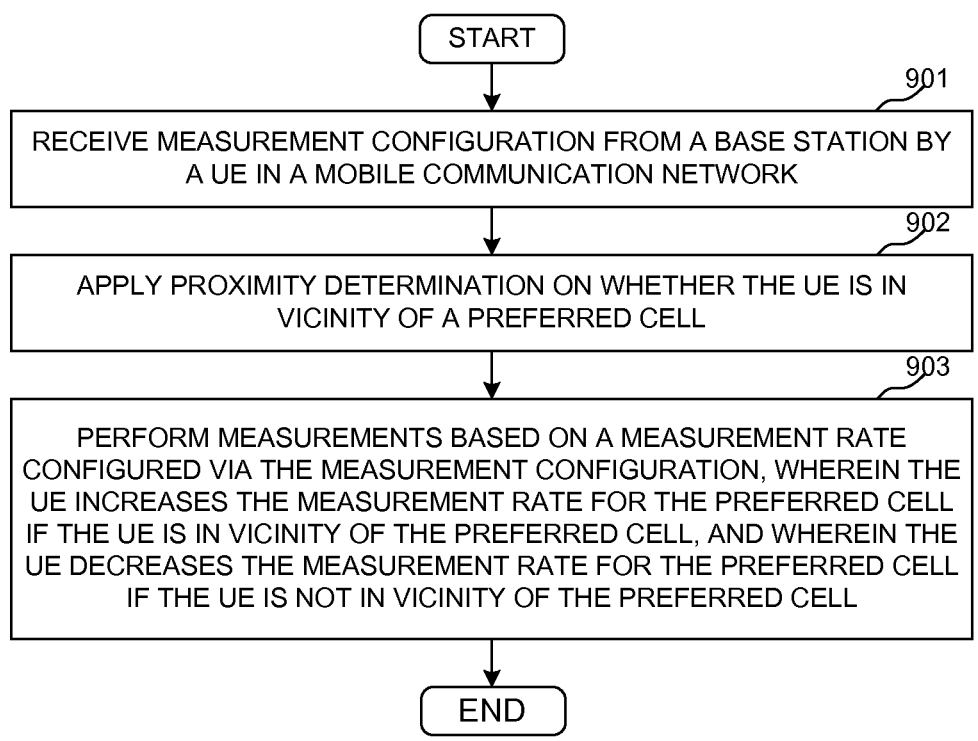
FIG. 9 is a flow chart of one embodiment of UE autonomous search and measure for small cell in accordance with one novel aspect.

FIG. 9 is a flow chart of one embodiment of a method of UE autonomous search and measure for small cell in accordance with one novel aspect. In step 901, a user equipment (UE) receives measurement configuration from a base station in a mobile communication network. In step 902, the UE applies proximity determination on whether the UE enters vicinity of a preferred cell. In step 903, the UE performs measurements based on a measurement rate (i.e., search rate) configured via the measurement configuration. If the UE is in vicinity of the preferred cell, then the UE increases the measurement rate for the preferred cell. On the other hand, if the UE is not in vicinity of the preferred cell, then the UE decreases the measurement rate for the preferred cell.

The proposed small cell discovery method can be applied for idle mode mobility management as well. For example, UE can obtain the small cell configuration or measurement parameters via eNB broadcasting messages or eNB unicasting messages when UE leaves RRC Connected state. With such small cell information, UE can perform cell selection/reselection onto small cells with priority. In one example, an idle-mode UE searches for a small cell with higher measurement frequency when it moves within the vicinity of the small cell.

Although the present invention is described above in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
receiving a measurement configuration from a base station by a user equipment (UE) in radio resource control (RRC) connected mode in a mobile communication network, wherein the measurement configuration comprises a plurality of measurement objects and at least one of the measurement objects is related to small cell measurements;
determining whether the UE is in vicinity of a small cell;
changing mobility measurements of the small cell by the UE based on said determination and the measurement configuration before receiving a subsequent measurement configuration from the base station;
increasing search rate for small cells if the UE is in vicinity of the small cell; and
decreasing search rate for small cells if the UE is not in vicinity of the small cell, wherein the UE is capable of determining whether the UE is in vicinity of the small cell.

2. The method of claim 1, further comprising:
transmitting proximity indication information to the base station, wherein the proximity indication information includes at least a carrier frequency of the small cell, wherein the proximity indication information is transmitted in response to receiving a proximity request from the base station.

3. The method of claim 1, further comprising:
receiving cell ID information, about one or multiple neighbor small cells, from the base station such that the UE can detect and identify the small cells faster and with less battery consumption.

4. The method of claim 1, further comprising:
receiving location information from the base station such that the UE can determine whether the UE moves into the vicinity of the small cell.

5. The method of claim 4, further comprising:
receiving frequency information about the small cells, or reference to measurement objects configured for the UE, such that the UE can search for the small cells.

6. The method of claim 4, wherein the location information contains radio signal parameters of neighboring cells related to coverage of the small cell.

7. The method of claim 4, wherein the location information contains a geographical area configuration based on latitude and longitude.

8. The method of claim 1, wherein the determining is based on vicinity detection information autonomously stored by the UE, and wherein the small cell is not a closed subscriber group (CSG) cell.

9. The method of claim 8, wherein the UE stores the vicinity detection information only for cells that the UE has received a signaling indication that the UE may store said information.

10. The method of claim 8, wherein the stored vicinity detection information contains a location of the small cell and/or the radio signal measurements of neighboring cells of the small cell.

11. A user equipment (UE), comprising:
a receiver that receives a measurement configuration in radio resource control (RRC) connected mode from a base station in a mobile communication network, wherein the measurement configuration comprises a plurality of measurement objects and at least one of the measurement objects is related to small cell measurements;
a cell vicinity-detection module that determines whether the UE is in vicinity of a small cell;
a transmitter that transmits proximity indication information to the base station, wherein the proximity indication information includes at least a physical cell ID and a carrier frequency of the small cell;
a measurement module that performs measurements over the carrier frequency of the small cell, wherein the UE increases search rate for small cells if the UE is in vicinity of the small cell, and wherein the UE decreases search rate for small cells if the UE is not in vicinity of the small cell before receiving a subsequent measurement configuration from the base station.

12. The UE of claim 11, wherein the receiver receives cell ID information about one or multiple neighbor small cells from the base station such that the UE can identify the small cell.

13. The UE of claim 11, wherein the receiver receives at least location information from the base station such that the UE can determine whether the UE moves into the vicinity of the small cell.

14. The UE of claim 13, wherein the receiver receives at least frequency information about the small cells, or reference to measurement objects configured for the UE, such that the UE can search for the small cells.

15. The UE of claim 13, wherein the location information contains at least a location of the small cell and coverage information of neighboring cells of the small cell.

16. The UE of claim 11, wherein the determining is based on vicinity detection information autonomously stored by the UE, and wherein the small cell is not a closed subscriber group (CSG) cell.

17. The UE of claim 16, wherein the UE stores vicinity detection information only for cells that the UE has received a signaling indication that the UE may store said information.

18. The UE of claim 16, wherein the stored vicinity detection information contains a location of the small cell and coverage information of neighboring cells of the small cell.

19. A method, comprising:
receiving measurement configuration and a proximity request from a base station by a user equipment (UE) in radio resource control (RRC) connected mode in a mobile communication network, wherein the measurement configuration includes a measurement object configured for a preferred cell with at least a cell ID and location information;
in response to receiving the proximity request, applying proximity detection on whether the UE is in vicinity of the preferred cell based on the location information; and
performing measurements for the preferred cell based on the measurement configuration, wherein the UE continues to perform measurements for the preferred cell when the radio signal strength/quality of a serving cell is better than a stop-measurement threshold if the UE is in vicinity of the preferred cell, and wherein the UE stops measurements for the preferred cell when the radio signal strength/quality of the serving cell is better than the stop-measurement threshold if the UE is not in vicinity of the preferred cell.

20. The method of claim 19, wherein the location information contains at least a GPS location of the preferred cell and radio signal parameters of neighboring cells related to coverage of the preferred cell.

21. A user equipment (UE), comprising:
- a receiver that receives measurement configuration from a base station in a mobile communication network in radio resource control (RRC) connected mode, wherein the measurement configuration includes a measurement object configured for a preferred cell with at least a cell ID and location information;
- a cell vicinity-detection module that determines whether the UE is in vicinity of the preferred cell based on the location information; and
- a measurement module that performs measurements for the preferred cell based on the measurement configuration, wherein the UE continues to perform measurements for the preferred cell when the radio signal strength/quality of a serving cell is better than a stop-measurement threshold if the UE is in vicinity of the preferred cell, and wherein the UE stops measurements for the preferred cell when the radio signal strength/quality of the serving cell is better than the stop-measurement threshold if the UE is not in vicinity of the preferred cell.

22. The UE of claim 21, wherein the location information contains at least a GPS location of the preferred cell and radio signal parameters of neighboring cells related to coverage of the preferred cell.

* * * * *